Patented June 6, 1950

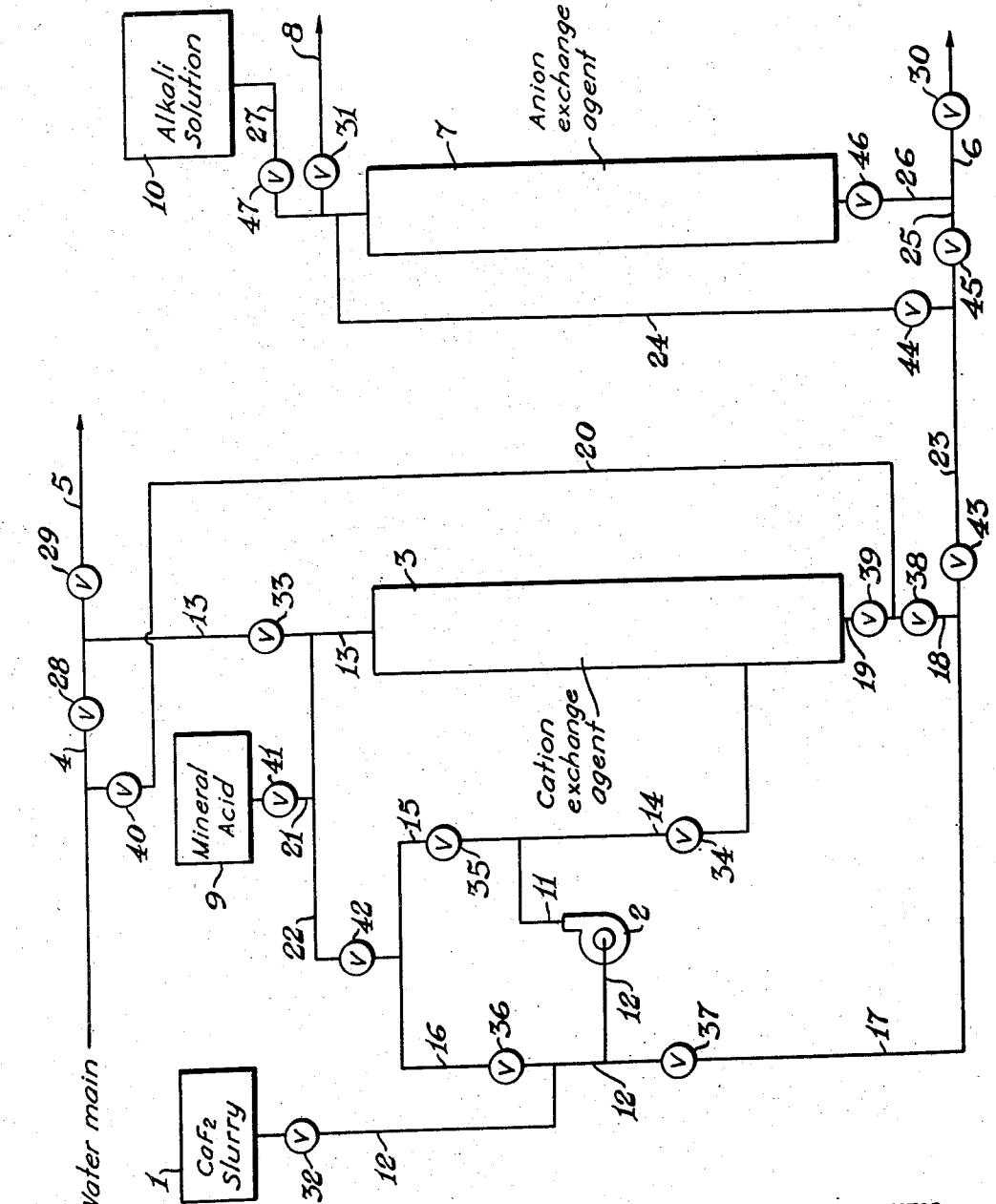

2,510,855

UNITED STATES PATENT OFFICE 2,510,855

REMOVAL OF SILICON COMPOUNDS FROM WATER

William C. Bauman, Midland, Mich., assignor to The Dow Chemical Company, Midland, Mich., a corporation of Delaware Application January 26, 1946, Serial No. 643,783

13 Claims. (Cl. 210—24)

This invention concerns an improved method of removing impurities, particularly dissolved silicon compounds, from water.

It is known that water may be softened by passage through a bed of a cation exchange agent and that it may be freed of most dissolved salts, acids, or alkalies by passage through a series of beds, at least one of which is a bed of a cation exchange agent and another of an anion exchange agent. However, natural waters, e. g. of rivers, lakes, or wells, usually contain a small, but significant, amount of dissolved silica which presumably is in the form of silicic acid or a metal silicate. Such direct treatment of the water with ion exchange agents does not result in satisfactory removal of the dissolved silica. For certain purposes, e. g. as feed water for high pressure boilers, it is important that dissolved silicon compounds be removed as completely as possible.

In my copending application, Serial No. 545,389, filed July 17, 1944, now a Patent Number 2,502,120, Mar. 28, 1950, of which this is a continuation-in-part, I have disclosed that dissolved silicon compounds may be removed from water by treating the latter with a water-soluble fluoride, e. g. hydrofluoric acid, sodium fluoride, potassium fluoride, or ammonium bifluoride, etc., and passing the water over a basic form of an anion exchange agent to cause absorption of acid radicals, including those comprising silicon. I have also disclosed that the water may advantageously be passed over an acid form of a cation exchange agent to remove metal ions of any dissolved salts prior to passage over the anion exchange agent, since such salts, if present during treatment with the anion exchange agent, may interfere with the action of the latter in removing dissolved silicon compounds. The treatment with a soluble fluoride and both ion exchange agents is effective in removing not only silicon compounds, but also other impurities such as salts, acids, or alkalies, and permits production of substantially pure water. Alternative procedures for causing absorption of dissolved silicon compounds from water by an anion exchange agent to form a substantially insoluble silicon-containing salt, e. g. a fluosilicate, of an anion exchange agent are disclosed in the copending application. All of the procedures require treatment of the water, or of an ion exchange agent, with a water-soluble fluoride.

Sparingly soluble metal fluorides such as calcium or magnesium fluoride are sufficiently soluble in pure water so that it might be thought that they could be dissolved in the water to be purified to give a fluoride concentration sufficient to permit the water to be freed of silicon compounds by subsequent passage over beds of cation and anion exchange agents in accordance with the method of my aforementioned copending application. Such procedure, using a sparingly soluble fluoride, has proven difficult to carry out satisfactorily and in most instances has failed to remove the dissolved silicon compounds as completely as desired, e. g. to a dissolved silica value of less than one part per million. There are several reasons for the difficulties encountered in such attempts to employ sparingly soluble fluorides in the process of the copending application. Natural waters which are to be freed of dissolved silicon compounds usually also contain relatively large proportions of other salts, one or more of which tend to suppress the solubility of the fluoride (e. g. calcium salts in the water tend to suppress the solubility of calcium fluoride) so that the fluoride usually is less soluble in a natural water to be treated than in pure water. Also, the sparingly soluble fluorides appear to be slow in dissolving to the extent necessary to saturate water therewith so that, when testing such fluoride under practical operating conditions in the method of the copending application, saturation of the water with the fluoride is probably seldom attained.

It is an object of this invention to provide a modification of the method of my copending application, Serial No. 545,389, which will permit satisfactory employment of a sparingly soluble, ionizable fluoride as a treating agent for the removal of dissolved silicon compounds from water. For the purpose of this invention, fluorides which dissolve in substantially pure water to an extent such as to render available in the solution less than 3 gram atomic weights of ionizable fluorine per 1000 kilograms of water are considered to be sparingly soluble. Examples of such sparingly soluble fluorides are calcium fluoride, strontium fluoride, magnesium fluoride, etc. As mentioned above, although such sparingly soluble fluorides can be used directly in the method of my copending application, Serial No. 545,389, to obtain at least partial removal of silicon compounds from the water under treatment, direct use of the sparingly soluble fluorides in said method is troublesome and often results in incomplete removal of silicon compounds from the water.

Another object of this invention is to provide a method of rendering water substantially free of all ionizable inorganic impurities, such as salts, acids, or alkalies, and also of dissolved silicon compounds, which method permits satisfactory employment of a sparingly soluble fluoride as a treating agent for causing removal of the silicon compounds. Other objects will be apparent from the following description of the invention.

I have discovered that by intimately admixing a finely divided, sparingly soluble, ionizable fluoride with a cation exchange agent in its acidic form and passing water through a bed of the mixture, the fluoride and exchange agent may be caused to react together at a rate such as to produce in the water hydrofluoric acid in a concentration sufficient for reaction with from 30 to 50 parts or more of dissolved silica per million parts of the water with resultant conversion of the dissolved silica to an acidic compound, presumably fluosilicic acid, capable of absorption by an anion exchange agent. The concentration of hydrogen fluoride which may thus readily be generated from a sparingly soluble fluoride is far in excess of that required for substantially complete removal, by my process, of the dissolved silicon compounds in all natural waters known to me. I have also discovered a practical mode of admixing the sparingly soluble fluoride with a cation exchange agent which permits convenient practice of the method to obtain substantially complete removal of all ionizable compounds from the water under treatment.

The accompanying drawing is a diagrammatic sketch illustrating an arrangement of apparatus and a preferred order of flows of materials for practice of the invention. However, other procedures and arrangements of apparatus may be employed, and the invention is not restricted to those shown in the drawing.

Numeral 1 of the drawing designates a tank or other container for an aqeous slurry of a sparingly soluble, ionizable fluoride such as calcium fluoride. The storage vessel 1 may advantageously be provided with a mechanical stirrer, not shown, or other conventional means for agitating the slurry. A pump 2 is arranged so that it may either deliver the fluoride slurry to a chamber 3, containing a fairly deep bed of a cation exchange agent, or may cause circulation of a liquid through said bed, as hereinafter described. A line 4, provided with a valve 28, connects the treating system with a source of the water to be purified, e. g. a water main. Lines 5, 6 and 8, which are provided with the respective valves 29, 30 and 31, permit discharge of liquids from the system. The numeral 7 designates a chamber containing a bed of an anion exchange agent. The numerals 9 and 10 designate tanks or other vessels containing, respectively, a mineral acid and an aqueous alkali solution for use in regenerating the ion exchange agents after they have become spent due to use in the water purification operations. Lines 11, 12, 13, 14, 15, 16, 17, 18, 19, 20, 21, 22, 23, 24, 25, 26, and 27, which lines 12-27, inclusive, are provided with the respective valves 32, 33, 34, 35, 36, 37, 38, 39, 40, 41, 42, 43, 44, 45, 46, and 47 connect the various pieces of apparatus mentioned above and permit flows of liquids through the treating system as hereinafter described.

The method of this invention involves intimately admixing a finely divided and sparingly soluble, ionizable fluoride with a bed of a cation exchange agent in its acid form; thereafter passing the water which is to be purified through a bed of the resultant mixture of sparingly soluble fluoride and cation exchange agent and then through another bed comprising a basic form of an anion exchange agent; and, after one or both of the beds of ion exchange agents has become spent by absorbing ions from the water under treatment, regeneration of the ion exchange agents, preferably by passing an aqueous solution of an acid through both beds and thereafter treating the anion exchange agent with an aqueous alkali solution. Any of the sparingly soluble fluorides hereinbefore mentioned may be used as a treating agent in the process provided it is in the form of particles sufficiently fine to permit fairly rapid reaction with the cation exchange agent and cause formation of hydrofluoric acid in the amount and at the rate necessary for reaction with dissolved silicon compounds in the water under treatment. The maximum particle size of fluoride suitable for the purpose cannot definitely be fixed, since it varies somewhat with different sparingly soluble fluorides and with changes in the dissolved silica content of the water to be treated, or with changes in the rate of flow of the water, etc. In most instances, the sparingly soluble fluoride is employed in a powdered form capable, for the most part, of passing through a 200 mesh screen. It preferably is composed principally of particles capable of passing through a 300 mesh screen.

Any of the usual water-insoluble ion exchange agents may be used in the process, provided the cation exchange agent is initially largely in its acidic form, e. g. in the form of a so-called "hydrogen zeolite," and the anion exchange agent is initially largely in its basic form. Examples of cation exchange agents which may be used are sulphonated coal, water-insoluble sulphonated- or carboxylated-organic resins, etc. Examples of suitable anion exchange agents are resinous meta-phenylenediamine and formaldehyde condensation products; resinous condensation products of phenol, formaldehyde and polyalkylenediamines; and resinous condensation products of aliphatic amines, aldehydes and ketones; etc.

The cation exchange agent simultaneously performs at least three important functions in the process, viz.: (1) that of removing directly from water metal ions of salts or bases usually present as impurities in natural waters, (2) that of reacting with the sparingly soluble fluoride to generate the hydrofluoric acid required to effect removal of dissolved silicon compounds from the water, and (3) that of serving as a filter bed for retention of unconsumed portions of the sparingly soluble fluoride so as to avoid sweepage of the latter from the bed by the water under treatment with resultant contamination of the treated water. The reaction between the sparingly soluble fluoride and the cation exchange agent occurs gradually, e. g. during passage of water through the mixture, whereas the cation exchange agent reacts rapidly to absorb metal ions from the water under treatment.

The proportion of soluble fluoride to be admixed with a cation exchange agent may be varied widely, the optimum proportion being dependent upon the relative amounts of metal ions and of dissolved silica in the water to be treated. In each cycle of the process the cation exchange agent is usually employed in amount exceeding, often by 5-fold or more, the chemical equivalent of the sparingly soluble fluoride. However, in the treatment of water which is substantially pure, except for the presence of dissolved silicon compounds, the sparingly soluble fluoride may advantageously be used in greater proportions, e. g. in proportions approaching, or, if desired, even exceeding the chemical equivalent of the cation exchange agent. The sparingly soluble fluoride is, in each cycle, used in amount such as to contain at least 6, and preferably 12 or more, gram atomic weights of fluorine per gram atomic weight of silicon in the silicon compounds contained in the amount of water to be treated in said cycle. The cation exchange agent is preferably used in sufficient excess over that chemically equivalent to the sparingly soluble fluoride so as to react with, and thus absorb, metal ions, e. g. of salts, in the water to be treated during the cycle.

For purpose of clarity, it may be mentioned that one chemical equivalent weight of a cation exchange agent is the amount which, when the agent is in the form of its sodium salt, contains one atomic weight of sodium. Since calcium fluoride contains two fluorine atoms in the molecule one chemical equivalent weight of calcium fluoride is one-half mole thereof. In other words, a sodium salt of a cation exchange agent in amount such as to contain 23 grams (one atomic weight) of sodium is chemically equivalent to 39 grams (one-half mole) of calcium fluoride.

The sparingly soluble fluoride may be admixed in any desired manner with the cation exchange agent prior to, or during, the water purification operations of the process. However, certain procedures are inconvenient or difficult to carry out so as to obtain substantially complete purification of the water subjected to treatment. For instance, the solid fluoride and cation exchange agent may be mechanically admixed, e. g. in a tumbler, prior to use in the process. However, such procedure would be inconvenient in successive cycles of the process, since it would involve removing and again forming the bed of exchange agent in each cycle. Admixture of the sparingly soluble fluoride with water fed to and through the entire depth of the bed of cation exchange agent has not proven very satisfactory for the reason that the fluoride tends to accumulate near the surface of the bed into which the mixture flows, instead of becoming evenly distributed with the ion exchange agent so as to permit ready reaction with the latter. Also, in the procedure last mentioned it is difficult to avoid channeling of a small portion of the slurry of sparingly soluble fluoride through the bed of exchange agent with resultant occurrence of the fluoride, or of its positive ion, e. g. calcium ions, in the effluent water. Admixture of the fluoride with the exchange agent may satisfactorily be accomplished by feeding a slurry of the fluoride into the bed of cation exchange agent and causing the liquid to flow upward through the bed while blowing a gas such as air, or nitrogen, etc., into the mixture so as to agitate the latter and cause efficient mixing.

I have found that the fluoride and cation exchange agent may conveniently and efficiently be admixed to cause distribution of the fluoride throughout a major portion of the bed of cation exchange agent by feeding an aqueous slurry of the fluoride into the bottom, or preferably into a lower section, of the bed, e. g. through a usual header for distribution of the slurry over the horizontal cross-sectional area of the bed, and causing the liquid to flow upward through and from the bed. The upflow of liquid causes agitation of the mixture and resultant distribution of the fluoride throughout upper portions of the bed. Liquid which flows from the upper surface of the bed may thereafter advantageously be returned downward through the bed so that the latter may filter therefrom any suspended fluoride. This procedure, which is preferred, results in formation of a bed, the upper portions of which consist of an intimate admixture of the fluoride and cation exchange agent and a lower portion of which is relatively free of the sparingly soluble fluoride and is effective as a filter to prevent sweepage of unreacted fluoride from the bed during use of the latter for the purification of water. Water to be purified is passed downward through the bed thus formed. Although the invention is not restricted as to the procedure employed in admixing the sparingly soluble fluoride with the cation exchange agent, it is concerned particularly with the preferred procedure just described.

A mode of practicing the invention, which involves the above-mentioned preferred procedure for admixing a finely divided sparingly soluble fluoride with a cation exchange agent, will be described with reference to the arrangement of apparatus shown in the drawing. In describing the process, valves of the apparatus which should be open during each operation will be mentioned, it being understood that all other valves are closed.

The several chambers and containers 1, 3, 7, 9, and 10 having initially been charged with the materials indicated in the drawing, valves 40, 39, 33, and 29 are opened to cause an upflow of water through the bed of cation exchange agent in chamber 3 with resultant loosening of the granules from their initial packed condition. Such upflow is usually continued for two minutes or longer, e. g. for from 2 to 5 minutes.

Valve 40 is closed, valves 32, 34, 33, and 29 are opened, and pump 2 is operated to cause flow of an aqueous calcium fluoride slurry from tank 1 into and upward through the bed of an acidic form of a granular cation exchange agent in chamber 3. Due to agitation caused by upflow of water through the bed, the calcium fluoride, which preferably is of less than 300 mesh particle size, is intimately admixed with a major portion of the cation exchange agent. The rate of flow of the slurry is preferably such as to avoid appreciable sweepage of the fluoride or exchange agent from the bed together with effluent water. Introduction of the slurry is usually discontinued when from 0.2 to 0.5 chemical equivalent of fluoride has been admixed with the bed per chemical equivalent of the cation exchange agent, but the fluoride may be added in smaller or greater proportions if desired. The time required to carry out this operation varies with changes in rate of liquor flow or in the volume and dimensions of the bed of exchange agent, but usually is in the order of from 2 to 10 minutes.

While continuing operation of pump 2, valves 42, 36, and 34 are opened and all other valves closed so as to cause recirculation of the slurry, or of its water content, upward through the bed of cation exchange agent, usually for from 10 to 30 minutes or longer. This operation is for purpose of assuring intimate admixing of the fluoride with the cation exchange agent and may, in some instances, be omitted.

Valves 39, 38, 37, 35, and 42 are next opened, other valves being closed, and operation of pump 2 is continued so as to reverse the direction of flow of the recirculating liquid, i. e. so as to cause downward flow through the bed of cation exchange agent with resultant filtering of any suspended fluoride particles from the liquid by the bed. This operation, which is usually carried out over a period of from 30 minutes to 1 hour, also serves to repack the bed of exchange agent and to sweep from lower portions thereof any fluoride particles readily dislodged by a downward flow of water. It assures retention in the bed of unreacted sparingly soluble fluoride during subsequent operations of employing the bed for the purification of water.

Operation of pump 2 is discontinued, valves 28, 33, 39, 38, 43, 44, 46, and 30 are opened, other valves being closed, so as to cause downward flow of water, e. g. from a water main, first through the bed of cation exchange agent and sparingly soluble fluoride in chamber 3 and then through the bed of anion exchange agent in chamber 7 and from the system through outlet line 6. The inflowing water, which usually contains various dissolved salts and silicon compounds, sweeps the water, employed in preceding operations as a medium for the fluoride slurry, from chamber 3 to chamber 7 where any hydrofluoric acid generated during operation up to this point is absorbed by the basic anion exchange agent. During flow of water through chamber 3 the cation exchange agent absorbs the cations of salts or alkalies contained in the water and also reacts gradually with the sparingly soluble fluoride to generate hydrofluoric acid, which in turn reacts with dissolved silicon compounds, presumably to form fluosilicic acid, so that the silicon-containing product, as well as other acids, e. g. hydrochloric acid, sulphuric acid or excess hydrofluoric acid, in the water flowing from chamber 3, are absorbed by the anion exchange agent in chamber 7. The effluent water from chamber 7 is substantially free of dissolved salts or silicon compounds and often is of a purity commensurate with that of distilled water.

Because of the fact that the hydrofluoride of the anion exchange agent, formed by direct absorption of excess hydrofluoric acid from water passed over the same, is effective in absorbing directly naturally occurring dissolved silicon compounds, such as silicic acid or sodium silicate, the process often remains effective in freeing water of dissolved silicon compounds for considerable time after the bed of cation exchange agent is practically depleted of the sparingly soluble fluoride.

When one or both of the beds of ion exchange agents become spent, as is evidenced by a decrease in purity of water flowing from the system, valves 40, 39, 33, 29, 38, 43, 45, 46, and 31 are set in open positions, other valves being closed, so as to cause upflow of water through the beds to loosen and wash any accumulations of foreign matter from the beds. Such backwashing of the beds is usually continued for from 20 to 40 minutes. Thereafter, valves 28, 33, 41, 39, 38, 43, 44, 46, and 30 are set in open positions, and other valves closed, so as to cause flow of an aqueous acid solution through the beds of cation and anion exchange agents with resultant regeneration of the cation exchange agent and displacement and flushing of fluosilicic acid from the bed of anion exchange agent. The anion exchange agent is thereby converted to a salt of the acid used in the treatment, e. g. to its hydrochloride when using hydrochloric acid as a treating agent. In this connection, it may be mentioned that the anion exchange agent, after absorbing its capacity of a silicon compound, may be regenerated by direct treatment with an aqueous alkali, but that such treatment apparently causes partial decomposition of the soluble fluosilicate which is formed and causes deposition of a silicate in the bed of ion exchange agent. As a result, the capacity of the anion exchange agent for further absorption of dissolved silicon compounds from water is lower than that which it initially possessed. For this reason it is preferable that the spent ion exchange agent be treated with an acid, to cause displacement and flushing of fluosilicic acid therefrom, before being treated with an alkali. The aqueous solution of an acid other than fluosilicic acid, which is used to displace fluosilicic acid from the anion exchange agent, may contain dissolved salts such as sodium chloride, calcium chloride, magnesium chloride, etc.

When the acid solution flowing from the bed of anion exchange agent is found to be substantially free of fluosilicic acid, valve 41 is closed, valves 28, 33, 39, 38, 43, 44, 46, and 30 being maintained open, so as to flush excess acid from the beds with water. Valves 40, 38, 43, 44, 47, 46, and 30 are then set in open positions, other valves being closed, so as to cause passage of an aqueous solution of an alkali, e. g. sodium or potassium hydroxide, or a corresponding carbonate, etc., through the bed of anion exchange agent. The anion exchange agent is thereby reconverted to the basic form thereof and rendered suitable for re-use in the water purification operations. Passage of the alkaline solution into the bed of anion exchange agent is usually continued until liquor flowing from the bed contains unreacted alkali.

Thereafter, valve 47 is closed, valves 40, 38, 43, 44, 46, and 30 being maintained open, so as to flush excess alkali from the bed with water. In place of, or subsequent to, the operation last stated, valves 40, 38, 43, 45, 46, and 31 may advantageously be set in open positions, other valves being closed, so as to backwash the bed of anion exchange agent by causing an upflow of water therethrough. Such backwashing operation is for purpose of sweeping upward from the bed any sparingly soluble fluoride, e. g. calcium fluoride, which in preceding operations may have accumulated in the bed. The backwashing is a precautionary operation for purpose of avoiding possible contamination, by such accumulated fluoride, of water subsequently passed through the bed during the water purification stage of the process and it may be omitted. When such backwashing operation is employed, it may serve also as the step for flushing excess alkali from the bed of anion exchange agent.

The foregoing operations are those involved in a single cycle of the process. They may be repeated to effect purification of further quantities of water.

The procedure just described may be modified in various ways. For instance, the flow of water under treatment through the bed of anion exchange agent may be upward instead of downward. Also, prior to treatment for removal of dissolved silicon compounds by the method of this invention, the water may be freed in conventional ways, e. g. by means of ion exchange agents, of ionizable compounds such as salts, acids, or alkalies. The entire reactive capacities of the agents employed in the present process may thereby be devoted to the single purpose of removing silicon compounds from water and the amount of water which may be treated in each cycle of the process, before regeneration of the ion exchange agents becomes necessary, may be increased. Other ways in which the process may be modified will be apparent.

The following example describes one way in which the principle of the invention has been applied, but is not to be construed as limiting the invention:

*Example*

Apparatus similar to that illustrated in the accompanying drawing was employed in purifying water which, prior to the treatment, contained dissolved silicon compounds in amount corresponding to from 4.0 to 4.6 parts of $SiO_2$ per million parts of water and dissolved salts in amount chemically equivalent to between 10 and 14 grains of NaCl per gallon of water. The water was from a city water main. As a cation exchange agent, a granular, resinous sulphonated phenol-formaldehyde condensation product was employed in the form of a bed approximately 6 feet in depth and of 0.0103 square foot cross-sectional area. The cation exchange agent was initially in its acid form. As the anion exchange agent, a granular basic form of a synthetic resin containing basic nitrogen groups was employed as a bed having the same dimensions as those of the bed of cation exchange agent. Water from a water main was passed upward through the bed of cation exchange agent at a rate of 0.1 gallon per minute for about 2 or 3 minutes in order to loosen the bed. While continuing such flow of water from the main, an aqueous slurry of calcium fluoride (of sufficient fineness to pass a 300 mesh screen) was pumped at a rate of 0.1 gallon per minute into the bed of cation exchange agent through a header within the bed and about 1.5 feet from the bottom of the bed. The slurry flowed upward within the bed. Introduction of the calcium fluoride slurry was carried out over a period of 2 or 3 minutes. It is estimated that approximately 6 grams of finely divided calcium fluoride was fed into the bed of cation exchange agent. Feed of the calcium fluoride slurry, and also of water from the city main, were discontinued, and water within the bed of cation exchange agent was caused to circulate for 15 minutes upward through the bed at a rate of 0.1 gallon per minute with continuous return of water from the top to a lower section of the bed. The direction of flow was reversed and the same water was caused to circulate at a rate of 0.05 gallon per minute downward through the bed, with continuous return to the top of the bed, for a period of 45 minutes. Thereafter water from the city main was passed at a rate of 0.05 gallon per minute first downward through the bed of cation exchange agent, then downward through the bed of anion exchange agent. The effluent water was collected in successive small portions and each portion was analyzed to determine its content of dissolved silica, of fluoride ions, and of soluble salts and also to determine its hardness. The analyses are presented in the following table which expresses the content of dissolved silicon compounds as parts of $SiO_2$ per million parts of water, the content of fluoride ions as parts of fluorine per million parts of water, the chemical equivalents of the dissolved salts as grains of NaCl per gallon of water, and the hardness as grains of $CaCO_3$ per gallon of water. The samples of effluent water are identified in terms of the liters of effluent water collected up to the stated values; thus, "0–6" means that the first 6 liters of effluent water was analyzed and "55–68" means that the portion analyzed was from the 55th to and including the 68th liter of water flow from the system, etc.

Table

| Portions of Treated $H_2O$ | $SiO_2$, P. P. M. | Salts Grains NaCl per Gal. | Analysis Hardness Grains $CaCO_3$ per Gal. | F- Conc., P. P. M. |
|---|---|---|---|---|
| 0–6 | 0.0 | 0.7 | 0.1 | 0 |
| 6–18 | 0.0 | 0.5 | 0.0 | 0 |
| 18–29 | 0.0 | 0.4 | 0.0 | 0 |
| 29–40 | 0.0 | 0.4 | 0.0 | 0 |
| 40–46 | 0.0 | 0.4 | 0.0 | 0 |
| 46–55 | 0.0 | 0.5 | 0.0 | 0 |
| 55–68 | 0.0 | 0.5 | 0.0 | 0 |
| 68–79 | 0.0 | 0.5 | 0.0 | 0 |
| 79–90 | 0.0 | 0.5 | 0.0 | 0 |
| 90–104 | 0.0 | 0.7 | 0.0 | 0 |
| 104–109 | 0.0 | 0.7 | 0.0 | 0 |
| 109–118 | 0.1 | 0.7 | 0.0 | 0 |
| 118–129 | 0.0 | 0.7 | 0.0 | 0 |
| 129–139 | 0.1 | 0.8 | 0.0 | 0 |
| 139–149 | 0.1 | 0.9 | 0.0 | 0 |
| 149–161 | 0.0 | 1.3 | 0.0 | 3 |
| 161–172 | 0.5 | 2.5 | 0.1 | 9 |
| 172–184 | 2.6 | 4.5 | | 13 |

As will be seen, the system was highly effective in removing silica and dissolved salts from the water until a total of 161 liters of water had been treated. The procedure in regenerating the ion exchange agents is to pass water upward through both beds of said agents to loosen the beds and wash any accumulations of dirt therefrom, then to pass a dilute mineral acid solution successively through the beds of cation and anion exchange agent, wash free acid from the beds with water, treat the anion exchange agent with an alkali, wash excess alkali from the bed of anion exchange agent, and admix a finely divided, sparingly soluble fluoride with the bed of cation exchange. The system is then in condition for further use in purifying water.

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. A method of removing dissolved silicon compounds from water which comprises forming an intimate mixture of a finely divided fluoride, of the group consisting of calcium fluoride, strontium fluoride, and magnesium fluoride, and a granular cation exchange agent in its acid form, passing water which contains a dissolved silicon compound through a bed comprising said intimate mixture of sparingly soluble fluoride and a substantially water-insoluble cation exchange agent, and passing the water from said bed to and through another bed comprising a substantially water-insoluble basic form of an anion exchange agent.

2. In a method for removing dissolved silicon compounds from water, the steps of forming an intimate mixture of a fluoride, of the group consisting of calcium fluoride, strontium fluoride, and magnesium fluoride, and a substantially water-insoluble granular cation exchange agent in its acid form by passing an aqueous slurry of the fluoride in the form of particles of smaller than 250 mesh size into a lower section of a bed of the cation exchange agent and upward within the bed, and thereafter circulating water of said slurry downward through the bed.

3. In a method of treating water containing a dissolved silicon compound to render it substantially free of the latter, the steps of passing the water to be treated through a bed comprising an intimate mixture of an acid form of a substantially water-insoluble cation exchange agent and a finely divided calcium fluoride and then through a bed comprising a substantially water-insoluble basic form of an anion exchange agent, subsequently regenerating the used ion exchange agents by passing an aqueous solution of an acid successively through the beds of cation exchange agent and anion exchange agent and thereafter treating the anion exchange agent with an aqueous solution of an alkali.

4. The method, as described in claim 3, wherein the acid is a hydrohalic acid.

5. The method, as described in claim 3, wherein the acid is hydrochloric acid and the alkali is an alkali metal carbonate.

6. In a method for removing dissolved silicon compounds from water, the steps of forming an intimate mixture of a finely divided fluoride, of the group consisting of calcium fluoride, strontium fluoride, and magnesium fluoride, and an acid form of a substantially water-insoluble granular cation exchange agent by passing an aqueous slurry of said fluoride into a lower section of a bed of the cation exchange agent and upward within the bed and then circulating water of said slurry downward through the bed, thereafter passing water which contains a dissolved silicon compound downward through said bed and thence through another bed comprising a substantially water-insoluble basic form of an anion exchange agent to cause removal from the water of the dissolved silicon compound, and, after use in thus freeing water of a dissolved silicon compound, regenerating the ion exchange agents by passing an aqueous solution of an acid successively through the beds of cation exchange agent and anion exchange agent and thereafter treating the anion exchange agent with an aqueous solution of an alkali.

7. The method, as described in claim 1, wherein the fluoride is calcium fluoride.

8. The method, as described in claim 1, wherein the fluoride consists for the most part of calcium fluoride in the form of particles of smaller than 250 mesh size.

9. The method, as described in claim 2, wherein the fluoride is calcium fluoride.

10. The method, as described in claim 2, wherein the fluoride consists for the most part of calcium fluoride particles of smaller than 250 mesh size.

11. The method, as described in claim 6, wherein the fluoride is calcium fluoride.

12. The method, as described in claim 6, wherein the fluoride consists for the most part of calcium fluoride particles of smaller than 250 mesh size and the acid used in regenerating the ion exchange agents is a hydrohalic acid.

13. The method, as described in claim 6, wherein the fluoride consists for the most part of calcium fluoride particles of smaller than 300 mesh size and the acid used in regenerating the ion exchange agents is hydrochloric acid.

WILLIAM C. BAUMAN.

REFERENCES CITED

The following references are of record in the file of this patent:

UNITED STATES PATENTS

| Number | Name | Date |
| --- | --- | --- |
| 404,180 | Doremus | May 28, 1889 |
| 2,155,318 | Liebknecht | Apr. 18, 1939 |
| 2,208,172 | Urbain | July 16, 1940 |
| 2,281,194 | Holmes et al. | Apr. 28, 1942 |
| 2,368,574 | Shoemaker | Jan. 30, 1945 |